March 10, 1931.　　　　C. S. HALL　　　　1,795,334
AIRCRAFT
Filed Jan. 19, 1929　　　3 Sheets-Sheet 1
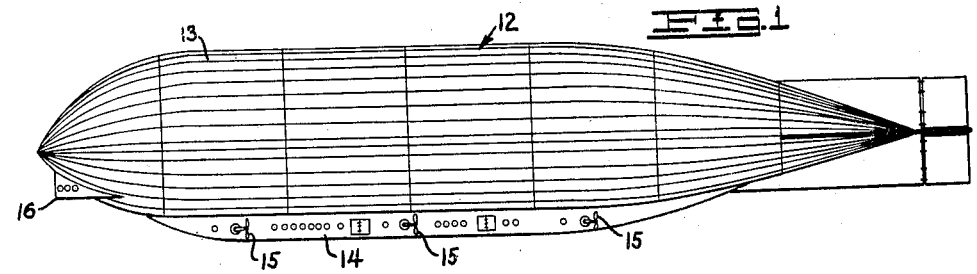
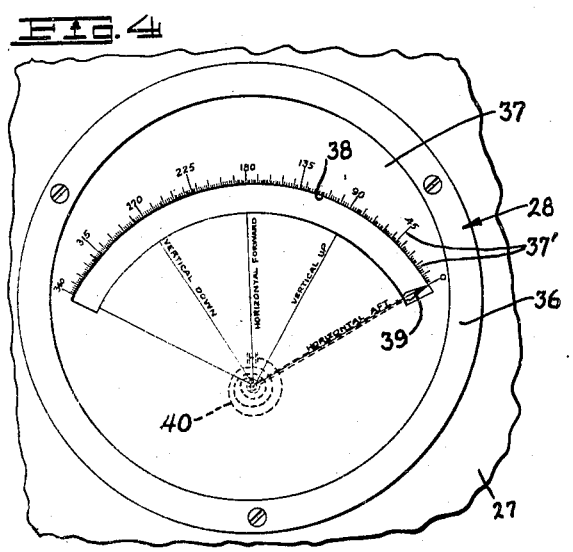
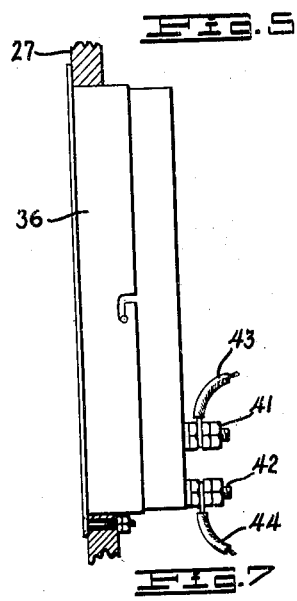
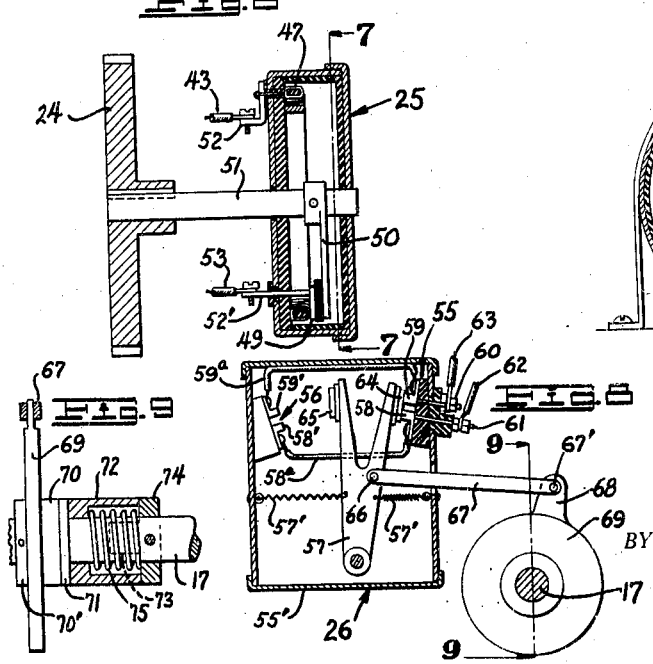
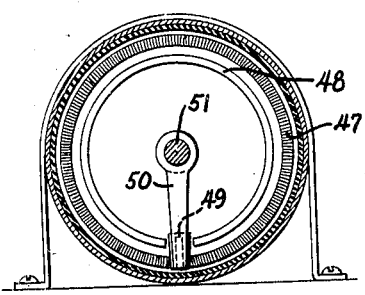
INVENTOR.
C. S. HALL
BY
ATTORNEY.

March 10, 1931. C. S. HALL 1,795,334
AIRCRAFT
Filed Jan. 19, 1929 3 Sheets-Sheet 2

INVENTOR.
C. S. HALL
BY
ATTORNEY.

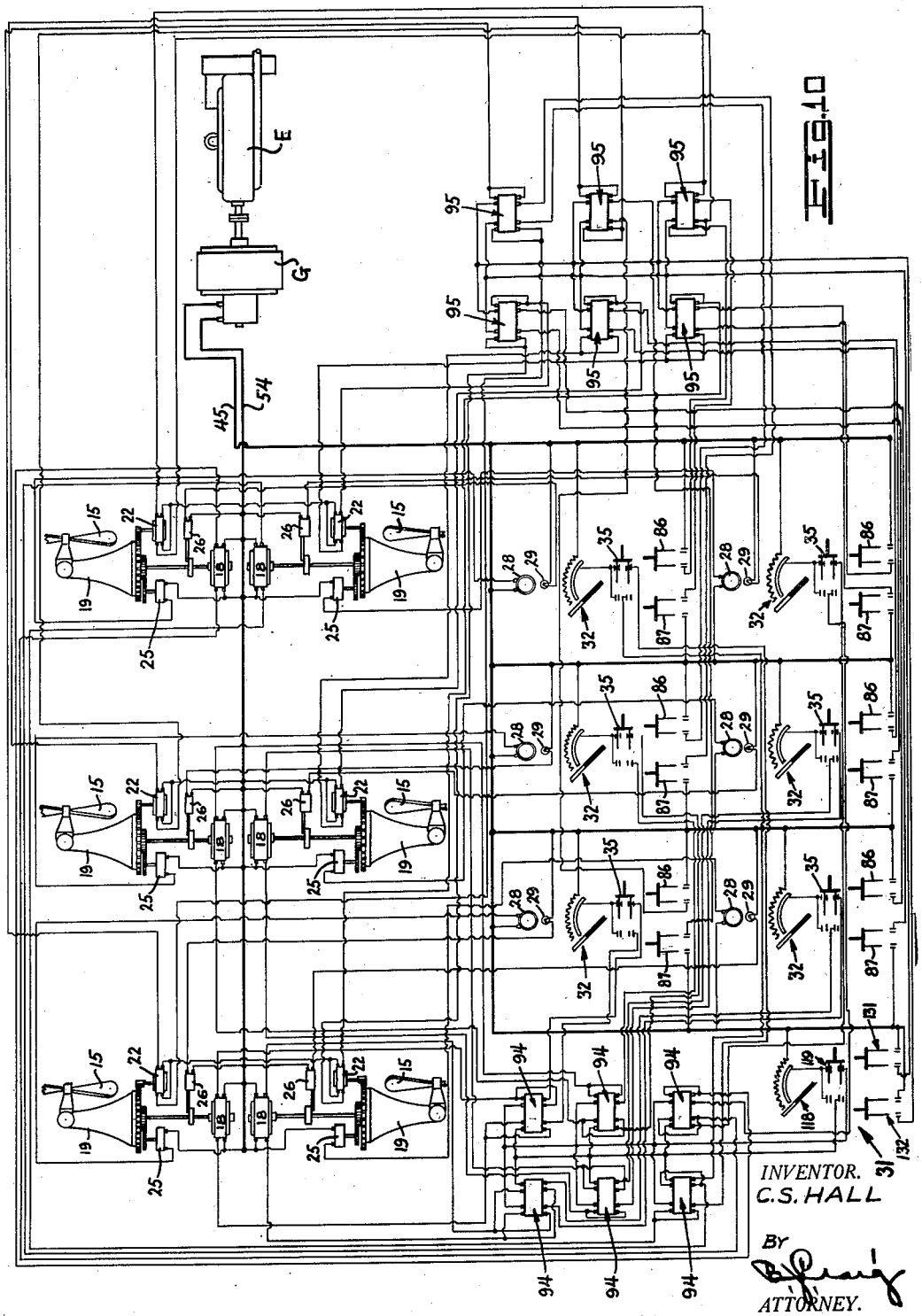

Patented Mar. 10, 1931

1,795,334

UNITED STATES PATENT OFFICE

CHARLES S. HALL, OF LOS ANGELES, CALIFORNIA

AIRCRAFT

Application filed January 19, 1929. Serial No. 333,630.

This invention relates to aircraft.

The general object of my invention is to provide a novel system for controlling the movement of an aircraft.

A specific object of the invention is to provide a novel system for controlling the propeller driving means and the angle of thrust of the propellers from a central station.

Another object is to provide an aircraft with indicators located at a central station and so arranged that the action of the various propellers of an aircraft will be indicated at the central station.

An additional object of my invention is to provide a novel control for aircraft operating devices.

Other objects of the invention will be apparent from the following description taken in connection with the accompanying drawings, wherein:

Fig. 1 is a side elevation of an aircraft of the dirigible type showing my invention applied thereto.

Fig. 4 is an enlarged fragmentary face view of the instrument board showing one of the propeller thrust angle indicators.

Fig. 5 is a side view of the propeller thrust angle indicator with various parts broken away.

Fig. 6 is a central vertical section of the mechanism for operating the propeller thrust angle indicator.

Fig. 7 is a section of the same taken on line 7—7 of Fig. 6.

Fig. 8 is a view partially in section of the mechanism for operating the light which indicates whether or not the propeller is rotating.

Fig. 9 is a view partially in section, taken on line 9—9 of Fig. 8, and

Fig. 10 is a diagrammatic view of the propeller operating and indicating system applied to a plurality of propellers.

Figure 2:
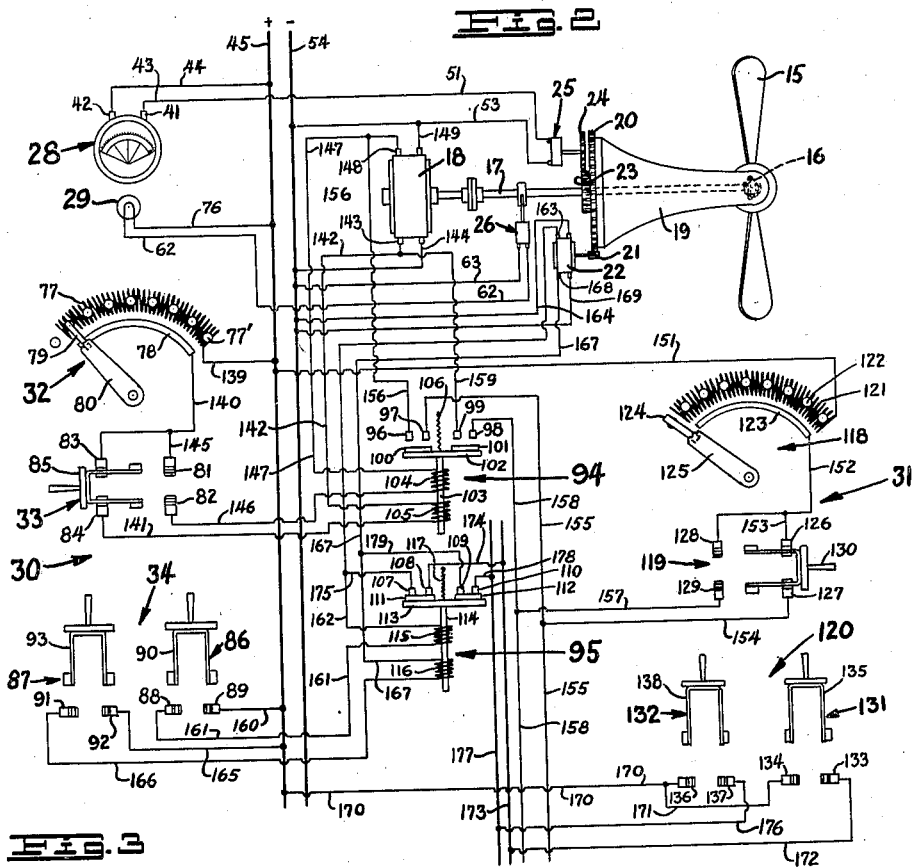
Fig. 2 is a diagrammatic view of a single propeller control and indicating device.
Figure 3:
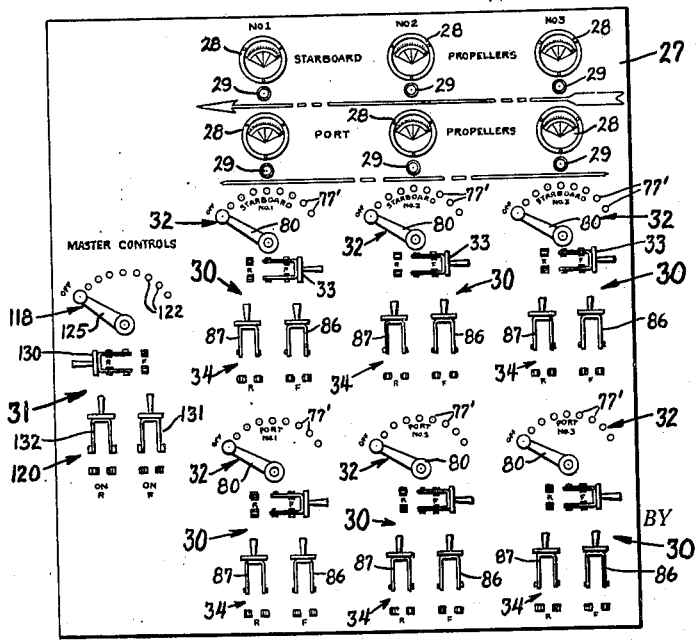
Fig. 3 is a front face view of an instrument board, which may be located in the control cabin, showing the various switches and indicators.

Referring to the drawings by reference characters I have illustrated my invention as applied to an aircraft shown as a dirigible 12, comprising one or more gas containers. The aircraft includes a machine and passenger carrying cabin 14 on which propellers 15 are mounted, three being on the port side and three on the starboard side of the aircraft. The aircraft has a control cabin 16 from which all of the propellers may be controlled.

The propeller mechanism shown in this application is preferably the same as that shown and described in my co-pending application Serial No. 8,383, filed February 11, 1925, which has matured into Patent Number 1,659,098, granted February 14, 1928, to which reference may be made for the details of construction. It will be understood however, that I do not wish to be limited to the specific details shown herein.

As all of the individual propeller control and indicating systems shown are the same, I will only describe one of the systems, and will describe the manner in which all the systems are connected to the master control. It will be understood that the use of my invention is not limited to the specific arrangement or construction of propellers shown.

Referring more particularly to Fig. 2, I have shown the propeller 15 driven by means of bevel gears 16 which are in turn driven by a shaft 17 from an electric motor 18. The propeller is mounted on a housing 19 which may be revolved to change the direction of thrust of the propeller. To revolve the housing, I show a gear 20 mounted thereon. This gear 20 may be driven by a pinion 21 on a motor 22.

Mounted on the housing 19, is a gear 23 in mesh with a gear 24 of a propeller thrust angle indicator operating mechanism 25, the details of which are more fully shown in Figs. 6 and 7. Mounted on and adjacent to the propeller drive shaft 17, I have shown a signal mechanism 26 (the details of which are more clearly shown in Figs. 8 and 9) for operating a light 29 which indicates whether or not the propeller 15 is revolving.

On an instrument board 27 which is preferably located in the control cabin 16, indicators 28 are mounted in pairs. These indicators are controlled by the propeller thrust angle indicator operating mechanism 25. Directly below each angle indicator is the light 29 which indicates whether or not the propeller whose indicator is above the light, is revolving. Arranged in pairs directly below each pair of indicators are mounted sets of switches 30, for the individual control of the various propeller mechanisms, and to one side a set of master control switches 31 are mounted for controlling all the propeller mechanisms in unison.

The individual propeller mechanism control switch sets 30 comprise a propeller speed control switch 32, a forward and reverse switch 33 and a set of switches 34 for controlling the propeller thrust angle.

As shown in Figs. 4 and 5, the propeller thrust angle indicator 28 comprises a housing 36 in which is mounted a dial 37 having on its face graduated markings 37', said markings in their entirety representing 360 degrees. Just below the marks 37' there is provided an elongated aperture 38 for viewing a pointer 39. The pointer 39 for indicating the angle of the propeller thrust may be mounted on the shaft of a volt meter 40 or other suitable instrument which will act to rotate a shaft on the rise and fall of an electric current. The volt meter 40 is provided with wiring terminals 41 and 42. The terminal 41 has a wire 43 secured thereto from the operating mechanism 25 while the terminal 42 has a wire 44 secured thereto which runs to a positive line wire 45 (see Fig. 2).

The propeller thrust angle indicator operating mechanism 25 as shown in Figs. 6 and 7 consists of a circular rheostat element 47 and a circular contact track 48 having contact formed between the two, when in operation, by a contact member 49 mounted on and insulated from an arm 50 which is secured adjacent one end of a shaft 51, while mounted adjacent the other end is the gear 24 which meshes with the gear 23 secured to the propeller housing 19. The rheostat element 47 is wired to a suitable terminal 52 from which runs the wire 43 to the terminal 41 of the indicator 28 (see Fig. 2). The circular contact track 48 is also provided with a terminal 52' from which a wire 53 runs to a negative line wire 54.

It will be apparent from the foregoing description that when the motor 22 is operated to revolve the propeller housing 19 the gear 23 will also revolve and in turn revolve the gear 24. As the gear 24 is revolved it turns the shaft 51 of the member 25, and causes the arm 50 to travel in one direction or the other over the rheostat element 47. As the arm 50 travels around contact is made between the rheostat element 47 and the contact ring 48 by the contact 49 which causes current to flow from the positive line wire 45 through wire 44 to the contact 42 of the indicator 28.

The current passes through the volt meter 40 of the indicator to the terminal 41 from whence it passes through the wire 43 to the terminal 52 of the actuating member 25. From the terminal 52 the current passes into the rheostat windings 47 whence, by means of the contact 49, it passes through the contact ring 48 to the terminal 52'. From the terminal 52' the current passes through wire 53 to the negative line wire 54. As the current passes through the volt meter 40 the volt meter shaft will rotate and cause the pointer 39 to move and the pointer 39 will indicate the angle of thrust of the propeller at all times.

As shown in Figs. 8 and 9 the mechanism 26 for operating the light 29 consists of two sets of contact members 55 and 56 mounted in a housing 55' with a pivoted contact arm 57 which is held, when the propeller shaft 17 is not rotating, in a vertical position by springs 57'. The set of contacts 55 comprise two contact members 58 and 59 having terminals 60 and 61 thereon. The terminal 61 of contact 58 has a wire 62 secured thereto which runs to the light 29, while the terminal 60 has a wire 63 secured thereto which runs to the negative line wire 54 (see Fig. 2). The other set of contacts 56 is also composed of two sets of contacts 58' and 59'. The contact 58' is suitably connected to the contact 58 by a wire 58a and the contact 59' is similarly connected to the contact 59 by a wire 59a.

The arm 57 is provided with contact bars 64 and 65 suitably insulated therefrom. The contact bar 64 is adapted to make contact between the contacts 58 and 59, and the contact bar 65 is adapted to make contact between the contacts 58' and 59', when the arm 57 is actuated to their respective sides.

The arm 57 has a link 67 pivotally secured thereto as at 66 which is pivotally secured as at 67' to an arm 68 of a disk 69. The disk 69 is made integral with a hub 70 (see Fig. 9), provided with a bore for the passage therethrough of the shaft 17. The disk 69 is backed by a washer 70' which is secured to the shaft 17. Loosely mounted on the shaft 17 against one end of the hub 70 I provide a fiber washer 71, and on the other side of the washer 71 I provide a member 72 which has a toothed engagement as at 73, with a member 74 which is secured to the shaft 17. The fiber disk 71 is held against the face of the hub 70 by the member 72 which is urged against the fiber disk by a coil spring 75 therein which bears against the member 74.

From the foregoing description it will be apparent that when the propeller drive shaft 17 is rotated clock-wise by the motor 18 to actuate the propeller 15 to drive the air craft 12, the shaft 17 will rotate the member 74 which will in turn rotate the member 72 through the medium of the teeth 73 and as the member 72 and the fiber disk 71 are urged against the hub 70 of the disk 69 by the spring 75, the disk 69 will tend to rotate with the shaft 17. As the disk 69 moves clock-wise the arm 68 and the link 67 move the arm 57 to the right and as the arm 57 moves to the right contact is made between the contacts 58 and 59 as shown in Fig. 8, by the contact bar 64. As contact is made from the contact 58 to the contact 59, an electric current is caused to flow from the positive line wire 45 through a wire 76 to the light 29 (see Fig. 2). After passing through the light the current runs through the wire 62 to the terminal 61 of the light operating mechanism 26, through the contact 58, contact bar 64 and contact 59 to the terminal 60, from whence it runs through the wire 63 to the negative line wire 54.

When the shaft 17 is rotated in an anti-clockwise direction the arm 57 will be moved to the left and cause contact to be made between the contacts 58' and 59' by means of the contact bar 65. When contact is thus made an electric current will be caused to flow as previously described except that the current from the wire 62 will pass through the contact 58 and the wire 58a to the contact 58' through the contact bar 65, contact 59' and the wire 59a to the contact 59 and thence through the wire 63 to the negative line wire 54.

As previously stated the individual propeller control switch sets 30 include a propeller speed control switch 32, a forward and reverse switch 33 for the propeller drive, and a set of switches 34 for controlling the propeller thrust angle.

The propeller speed control switch 32 includes a rheostat 77 provided with contacts 77', a contact segment 78, and a contact bar 79 mounted on a pivoted operating arm 80 (See Fig. 2).

The forward and reverse switch 33 is of the double knife switch type and includes a set of forward contacts 81 and 82, a set of reverse contacts 83 and 84, and a pivoted member 85 for bridging the contacts 81 and 82 and 83 and 84 respectively.

The propeller thrust angle control set 34 includes two single knife switches, a forward switch 86 and a reverse switch 87. The forward switch 86 includes a set of contacts 88 and 89 and a pivoted contacting member 90. The reverse switch 87 includes a set of contacts 91 and 92 and a pivoted contacting member 93.

In circuit with the speed control switch 32 and the forward and reverse switch 33 there is provided an automatic circuit breaker 94, and in circuit with the propeller thrust angle control set 34 there is another automatic circuit breaker 95. These circuit breakers act to cut out the influence of the master control set 31 when a single propeller control set 30 is actuated.

The circuit breaker 94 comprises a set of forward contacts 96 and 97 and a set of reverse contacts 98 and 99. The contacts 96 and 97 are normally bridged by a contact bar 100 and the contacts 98 and 99 are normally bridged by a contact bar 101. Both the contact bars 100 and 101 are suitably mounted on an insulated member 102 to which is secured a solenoid core 103. The core 103 is adapted to work inside of two windings 104 and 105. The insulated member 102 normally retains the contact bars 100 and 101 against their respective contacts by means of a coil spring 106.

The circuit breaker 95 is similar to the circuit breaker 94 and includes a set of forward contacts 107 and 108, and a set of reverse contacts 109 and 110. These contacts 107 and 108 are normally bridged by a contact bar 111 and the contacts 109 and 110 are similarly bridged by a contact bar 112. Both the contact bars 111 and 112 are suitably mounted on an insulated member 113 to which is secured a solenoid core 114. The solenoid core 114 is adapted to work inside of two windings 115 and 116. The insulated member 113 normally retains the contact bars 111 and 112 against their respective contacts by means of a coil spring 117.

The master control switch set 31 comprises switches similar to those in an individual propeller control set 30 and includes a propeller speed control switch 118, a forward and reverse switch 119 for controlling the propellers and a set of propeller thrust angle control switches 120. The master speed control switch 118 is shown as including a rheostat 121 provided with contacts 122, a contact segment 123, and a contact bar 124 mounted on an insulated pivoted arm 125. The forward and reverse set 119 is shown as of the double knife type and includes a set of forward contacts 126 and 127, a set of reverse contacts 128 and 129, and a pivoted contacting member 130.

The propeller thrust angle control switch set 120 is shown as comprising two single knife switches, a forward switch 131 and a reverse switch 132. The forward switch 131 includes a set of contacts 133 and 134, and a pivoted contacting member 135 and the reverse switch 132 includes a set of contacts 136 and 137, and a pivoted contacting member 138.

As shown in Fig. 2 of the drawings the master control switch 31 is set to drive all the propellers 15 of the aircraft in a forward direction while one of the individual control switches 30 shown in this view is set to drive its respective propeller in a reverse direction which it will do regardless of the set of the master switch owing to the circuit breaker 94.

The electrical current for operating the propeller drive motor 18 flows from the positive line wire 45 through a wire 139 to the rheostat 77, through one of the contacts 77' and the contact bar 79 to the contact segment 78 and thence through a wire 140 to the reverse contact 83 of the switch 33. From the contact 83 the current passes through the contacting member 85 to the contact 84 and thence through a wire 141 to the coil 105 of the circuit breaker 94. From the coil 105 it passes through a wire 142 to a reverse terminal 143 of the motor 18. From the motor the current passes through a wire 144 to the negative line wire 54.

As the current passes through the coil 105 of the circuit breaker 94 it energizes the coil and acts on the core 103 to cause the same to break the contact between the contact bars 100 and 101 and their respective contacts thus cutting out any influence of the master switch 31 on the motor 18.

When the switch 33 is set so that there is contact across the forward contacts 81 and 82 the current passes through the rheostat 32 as previously described but from the wire 140 it passes through a wire 145 to the contact 81, through the contacting members 85 to the contact 82 and thence through a wire 146 to the coil 104 of the circuit breaker 94. From the coil 104 the current passes through a wire 147 to a forward terminal 148 of the motor 18. From the motor 18 the current passes through a wire 149 to the wire 53 thence to the negative line wire 54.

As the current passes through the coil 104 the core 103 is actuated as previously described to break the contact between the contact bars 100 and 101 and their respective contacts to cut out the influence of the master control switch 31.

When the switch 33 of the individual propeller control switches 30 is set in a neutral position there will be no current passing through either of the coils 104 or 105 of the circuit breaker 94 and the coil spring 106 will cause the contact bars 100 and 101 to bridge their respective contacts. When the switch 30 is thus set and the master control switch 31 is set as shown in Fig. 2 of the drawings, the current for operating the motor 18 will flow from the positive line wire 45 through a wire 151 to the rheostat 121 through one of the contacts 122 and the contact bar 124 to the contact segment 123, and thence through a wire 152 and a wire 153 to the forward contact 126 of the forward and reverse switch 119. From the contact 126 the current flows through the contacting member 130 to the contact 127 and thence through a wire 154 to a wire 155 and thence to the forward contact 97 of the circuit breaker 94. The wire 155 is common to all of the circuit breakers 94 (see Fig. 10). From the contact 97 the current passes through the contact bar 100, and the contact 96 to a wire 156 and thence through the wire 147 to the forward terminal 148 of the motor 18.

When the contacting member 130 of the master control switch 119 is set to bridge the reverse contacts 128 and 129 the current will flow from the positive line wire 45 through the rheostat 121 to the wire 152 as previously described, thence to the contact 128. From the contact 128 the current passes through the contacting member 130 and contact 129 to a wire 157 and thence to a wire 158 to the contact 98 of the circuit breaker 94. From the contact 98 the current passes through the contact bar 101 and contact 99 to a wire 159 and thence to the reverse terminal 143 of the motor 18.

From the foregoing description it will be apparent that I have provided a simple and efficient dual control for the propellers of an aircraft.

When it is desirous to alter the angle thrust of a single propeller 15 the switch 86 of the propeller thrust angle control set 34 is set so that the contacting member 90 bridges the contacts 88 and 89. When the switch 86 is thus set the current for operating the motor 22 passes from the positive line wire 45 through a wire 160 to the contact 89, through the contacting member 90 and the contact 88 to a wire 161 and thence to the coil 115 of the circuit breaker 95. As the current passes through this coil and energizes the same it actuates the core 114 to cause the same to break contact between the contact bars 111 and 112 and their respective contacts and thus cut out the influence of the master set of propeller thrust angle control switches 120.

From the coil 115 the current passes through a wire 162 to a forward terminal 163 of the motor 22 whence the circuit passes through a wire 164 to the negative line wire 54. Thus the motor 22 is caused to rotate the propeller housing 19 to change the angle of the propeller thrust. When the propeller has attained the desired angle of thrust the contact between the contacts 88 and 89 is broken. The angle of the propeller thrust will be shown on the indicator 28 in the manner previously described.

When it is desired to return the propeller to its normal position or lessen the angle of thrust the reversing switch 87 of set 34 is moved so that the contacting member 93 bridges the contacts 91 and 92. The current will then flow from the positive line wire 45 through a wire 165 to the contact 92, through the contacting member 93 and contact 91 to a wire 166 and thence to the coil 116. As the current passes through this coil it actuates the core 114 to break the contact between the contact bars 111 and 112 and their respective contacts as previously described. From the coil 116 the current passes through a wire 167 to a reverse terminal 168 of the motor 22 and thence after operating the motor, through a wire 169 to the negative line wire 54. When the propeller has returned to the desired angle the contact between the contacts 91 and 92 is broken.

When it is desired to alter the angle of thrust of all the propellers simultaneously the switch 131 of the set 120 is moved so that the contacting member 135 bridges the contacts 133 and 134. When the switch 131 is thus set the current will flow from the positive line wire 45 through a wire 170, and a wire 171 to the contact 134, through the contacting member 135 and contact 133 to a wire 172 and thence through a wire 173 and a wire 174 to the contact 108 of circuit breaker 95. From the contact 108 the current passes through the contact bar 111 and contact 107 to a wire 175 to the wire 162 and thence to the contact 163 of the motor 22 and after operating the motor it passes through the wire 164 to the negative line wire 54.

As the motor operates it causes the propeller housing 19 to revolve to alter the angle of thrust of the propellers 15. When the propellers have attained the desired angle of thrust the contact between the contact members 133 and 134 is broken. The angle of thrust of the propellers will be shown on the instrument board by the indicators 28. When it is desired to return the propellers to their normal positions the reverse switch 132 of the set 120 is moved so that the contacting member 138 bridges the contacts 136 and 137. When the reverse switch 132 is in this position the current will flow from the positive line wire 45 through the wire 170 to the contact 136, through the contacting member 138 and contact 137 to a wire 176 and thence to a wire 177 and through a wire 178 to the contact 110 of the circuit breaker 95. The wire 177 is common to all of the circuit breakers 95. From the contact 111 the current passes through the contact bar 112 and contact 109 to a wire 179 and thence through the wire 167 to the reverse terminal 168 of the motor 22 and after operating the motor the current will pass through the wire 169 to the negative line wire 54.

In Fig. 10 I have shown the electricity for operating the various devices as being furnished by a generator G which is shown as driven by an internal combustion engine E.

The propellers of the aircraft may be driven by direct connection to the motors 18 as shown and described, or the motors 18 may be arranged to operate controlling mechanisms of any other form of propeller drive which may be desirable.

From the foregoing description it will be apparent that I have provided a novel and efficient means for controlling the speed of the propellers of an aircraft and the angle of thrust of said propellers either individually or simultaneously, and that said means of control may be readily installed in the navigating cabin of an aircraft.

Having thus described my invention, I claim:

1. In combination with an aircraft, a central control station, a propeller on said aircraft, means to drive said propeller and indicating means located at said central control station and electrically operated means connected to said indicating means and associated with said propeller and adapted to indicate whether said propeller is operating.

2. In combination with an aircraft, a central control cabin, a plurality of propellers on said aircraft, electrically controlled driving means for said propellers, individual speed control switches located in said central control cabin for each of said propellers, a master speed switch located in said central control cabin for controlling said propellers in unison and automatic cut-out means whereby when an individual switch is operated to control its associated propeller it will cut-out the influence of said master switch on said propeller.

3. In combination with an aircraft, a control station, a plurality of propellers on said aircraft, electrically controlled driving means for said propellers, individual speed control switches for each of said propellers, a master speed switch located at said control station for controlling said propellers in unison and means whereby when an individual switch is operated to control its associated propeller it will cut out the influence of said master switch on said propeller.

4. In combination with an aircraft, a plurality of propellers on said aircraft, driving means for said propellers, individual speed and forward and reverse control switches for controlling each of said propellers, a master speed and forward and reverse switch for controlling said propellers in unison and means enabling an individual switch to control its associated propeller without influence from said master switch on said propeller.

5. In combination with an aircraft, a central control cabin, a plurality of propellers on said aircraft, electrically controlled driving means for said propellers, individual speed and forward and reverse control switches located in said central control cabin for each of said propellers, a master speed and forward and reverse switches located in said central control cabin for controlling said propellers in unison and automatic cut-out means whereby when an individual switch is operated to control its associated propeller it will cut out the influence of said master switch on said associated propeller.

6. In combination with an aircraft, a central control cabin, a plurality of propellers on said aircraft, electrically controlled means for changing the thrust angle of said propellers, individual switches located in said central control cabin for operating said control means of each of said propellers, a master switch located in said central control cabin for operating said control means of all of said propellers in unison and automatic cut-out means whereby when an individual switch is operated to control its associated propeller it will cut out the influence of said master switch on said propeller.

7. In combination with an aircraft, a central control cabin, a plurality of propellers on said aircraft, means to drive said propellers, means to change the angle of thrust of said propellers, means located in said control cabin for controlling the action of said propellers in unison and means whereby the actuation of an individual propeller controlling means will automatically nullify the effect of said unison controls on a propeller being individually controlled.

8. The combination of an aircraft, a control cabin on said aircraft, propellers mounted on housings on said aircraft, means mounted on said aircraft for driving said propellers, means for turning said propeller housing to change the propeller thrust angle, means located in said control cabin for controlling said propellers, said propeller controlling means including means for controlling the speed of said propellers individually, means for controlling the direction of rotation of said propellers individually, means for controlling the turning of said propeller housings individually and means for controlling all of said propellers in unison, said last mentioned means including means for controlling the speed of the propellers in unison, means for controlling the direction of rotation of said propellers in unison, and means for controlling the turning of said propeller housings in unison.

9. In combination with an aircraft, a control cabin on said aircraft, a plurality of propellers mounted on housings on said aircraft, means on said aircraft for driving said propellers, said means including a shaft, means for turning said propeller housings to change the propeller thrust angle, means located in said central control cabin for controlling said propellers, said means including means for controlling the speed of said propellers in unison, means for controlling the turning of said propeller housings in unison, means in said central control cabin for indicating the angle of thrust of said propellers, means adjacent to and coacting with said propeller housings for operating said propeller thrust angle indicating means, means in said central control cabin for indicating whether or not said propellers are rotating and means adjacent to and coacting with said propeller drive shafts for actuating said propeller rotating indicators.

10. The combination of an aircraft, a control cabin on said aircraft, propellers mounted on housings on said aircraft, means mounted on said aircraft for driving said propellers, means for turning said propeller housings to change the propeller thrust angle, means located in said control cabin for controlling said propellers, said propeller controlling means including means for controlling the speed of said propellers individually, means for controlling the direction of rotation of said propellers individually, means for controlling the turning of said propeller housings individually, means for controlling all of said propellers in unison, said last mentioned means including means for controlling the speed of said propellers in unison and means for controlling the turning of said propeller housings in unison, said individual propeller controls and said unison propeller controls being in circuit, means in said circuit whereby the actuation of an individual propeller control will automatically cut out the effect of the unison controls on the propeller being controlled by said individual propeller control, means in said control cabin for indicating the angle of thrust of said propellers individually, means adjacent to and coacting with said propeller housings for operating said propeller thrust angle indicating means, individual means in said control cabin for indicating whether or not said propellers are rotating, and means for actuating said individual propeller rotating indicators.

In testimony whereof, I hereunto affix my signature.

CHARLES S. HALL.